G. P. Gordon.
Printing Press.
No. 1021. Reissued Jul. 31. 1860.
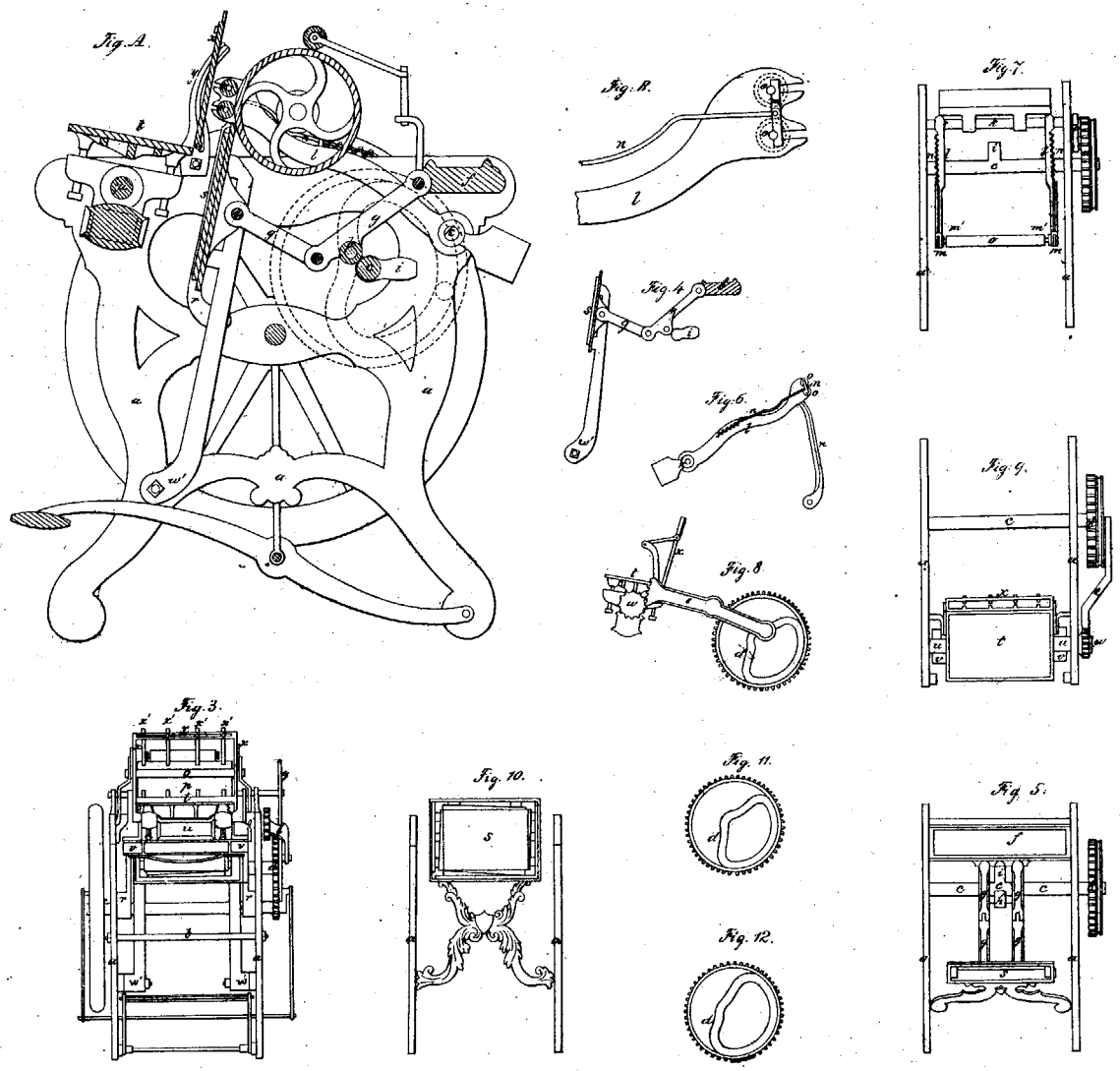
Witnesses.
J. B. Crosman.
Geo. W. Hunt
Inventor.
Geo. P. Gordon

UNITED STATES PATENT OFFICE.

GEORGE P. GORDON, OF NEW YORK, N. Y.

IMPROVEMENT IN PRINTING-PRESSES.

Specification forming part of Letters Patent No. 8,285, dated August 5, 1851; Reissue No. 366, dated April 8, 1856; Reissue No. 1,021, dated July 31, 1860.

DIVISION A.

*To all whom it may concern:*

Be it known that I, GEORGE P. GORDON, of New York, in the county and State of New York, have invented certain new and useful Improvements in Printing-Presses; and I do hereby declare the following to be a full, clear, and exact description of the same, reference being had to the annexed drawings, and to the letters of reference marked thereon, the same letter or mark always denoting the same part of the press in all the drawings.

I have herein shown all the drawings of my original patent, of August 5, 1851, and reissued April 8, 1856, in order that the separate parts may be fully distinguished in the form I have subdivided them.

Of the drawings, Figure A is a profile or side elevation in section of the whole machine, cut through its center. Fig. B indicates the method of holding the inking-rollers. Fig. 3 is a front view from the end of the press. Figs. 4, 6, and 8 are parts of the machine in detail. Figs. 5, 7, and 9 are views from the top of parts of the press as placed in the frame. Fig. 10 is a front view of the bed. Figs. 11 and 12 are views of the cams on the sides of gear-wheel *d*.

The nature of my invention as I have divided the claims formerly granted consists in giving to the inking-roller arms or frame a rocking motion, so that the inking-rollers will pass and repass over the form for each and every impression, said inking-roller arms or frame being held or controlled by an axis—that is, moving upon a fixed center—also, in carrying said inking-rollers over the form in a line parallel with the face of the form during the rocking of said roller arms or frame.

It also consists of a type-bed attached to and moving upon arms or supports which vibrate upon a center or centers, carrying the type-bed to and from the point of impression, for the purpose of allowing the type to be inked and the impression to be given, in combination with a rocking platen which shall assume a proper position to receive the sheet to be printed, and carry such sheet to the proper position for the reception of the impression, said platen rocking from one of these positions to the other, and allowing the sheet to be removed when printed, thus by the combined action of a vibrating bed and a rocking platen, receiving the sheet to be printed, carrying such sheet to the impression, giving to such sheet an impression, and delivering such sheet after it is printed.

It also consists in combining the rocking roller arms or frame with a vibrating-bed for the purpose of inking the form; also in vibrating the bed directly from the point of receiving the inking-rollers to the impression; also in so constructing a printing-press that the face of a rocking platen, the face of the form or type, the inking-rollers, and the ink-distributing cylinder or its equivalent, will all of them be before or under the eye of the person feeding the sheets to the press, so that said person may readily detect any imperfection in the working of the press, and yet at the same time said person may stand in front of the press and said rocking platen to feed and drive the press.

*t* is a platen rocking to and from the impression, and is supported upon the center or centers *u*.

Upon the main shaft *c* is the revolving cam *d'* upon the outside of the gear-wheel *d*, which conveys motion to the platen *t* through the segment gear-lever *e* and gear-wheel *w*, for the purpose of rocking said platen *t* upon the center or centers *u*.

Near the back end of the frame *a* is a substantial bearing-piece, *f*, firmly attached to the frame, for the purpose of receiving by joints the back ends of the toggles *g g*. The front ends of said toggles are attached by a joint to the back of the bed *s*. The toggles are of common construction, and have a friction-roller, *h*, near the center of action for the impression-cam *i* to impinge against, for the purpose of straightening said toggles and producing the impression.

At the center, lengthwise of the main shaft *c* is the impression-cam *i*, whose purpose is to give the impression by impinging at the proper time against the friction-roller *h*.

*k* is a rocking shaft or center, upon which is the crank *z*, operated by the cam $d^2$.

Upon the shaft *k* are the inking-roller arms or frame *l* of which there may be only one arm, or there may be one such arm on either side of the type or form, for the purpose of passing and repassing the inking-rollers over the form to ink said form.

Caps *m*, connected with the springs *n*, are for the purpose of confining the inking-rollers in their proper places in and during their progressive operations, but said inking-rollers will be partially governed in their movements by the local bearers *r r*.

*r r* are bearers placed on either side of the bed, as shown in Fig. 3, and their purpose is to keep, by the aid of the friction-rollers *m′ m′*, Fig. 7, placed on each end of the inking-rollers, the said inking-rollers from pressing too hard upon the form or type, and also for the purpose of causing the said inking-rollers to pass over the type in a line parallel with theface of the type.

The bed *s*, upon which the form is placed. is supported upon arms or uprights, *w′*, said uprights or arms moving upon an axis for the purpose of allowing the bed to move steadily to and from the point of impression. Said bed *s*, for the purpose of giving an impression, advances to the platen in proper time by means of the toggles *g g*, said toggles being operated by the cam *i*, and said bed may recede from the platen by its own gravity after an impression has been given.

Letters *o o* denote the inking-rollers.

*p* is an ink-distributing cylinder.

*g* is a pulley attached to the shaft of the ink-distributing cylinder *p*, for the purpose of giving motion to said cylinder.

*x* is a frisket having grippers or nippers attached to it, for the purpose of holding the sheet on the platen, and is placed between the movable bed *s* and the rocking platen *t*. Said frisket is hinged to the lower edge of the platen, but may be attached to some other part of the press. Said frisket is provided with slots, through which bolts or other suitable fastenings pass to hold the grippers *x′*, Fig. 3, so that said grippers may be adjusted in any direction. Two studs, one on each side of the frisket *x*, project from the sides of said frisket, and said studs work in the cams *y*, Fig. A, for the purpose of giving to the frisket *x* and the grippers *x′* proper motion. The cams *y* are secured to the frame *a*, one such cam being on each side of the platen, and said cams being so constructed as to give, as the platen rocks or turns to and from the impression, the proper motions to the frisket and the grippers.

Operation: Motion being given to the main shaft *c* sets all the moving parts of the machine in operation. We will suppose the platen *t* to be in the position as shown in Figs. A, 3, 8, and 9, for the purpose of receiving the sheet of paper to be printed, and that such sheet has been laid upon the platen. The cam *d′*, by the revolution of the gear-wheel *d*, will begin to act, and, through the segment gear-lever *e* and the gear-wheel *w*, will rock the platen to a vertical or nearly a vertical position for the purpose of receiving the impression. As the platen rocks toward the last-named position, the frisket *x*, through the cams *y* and the movements of the platen, will close the grippers *x*, firmly upon the sheet of paper, for the purpose of holding said sheet upon said platen until an impression has been given and the sheet relieved from the type. The platen having reached the position for receiving the impression the cam *i* on shaft *c* will begin to impinge on the friction-roller *h* on the toggles *g g*, for the purpose of straightening said toggles, and by the continued revolution of said shaft *c* said toggles will be straightened and the bed *s* will be forced forward until the form or type on the bed is pressed against the sheet of paper on the platen and a printed impression is produced. Just before the cam *i* impinges on the friction roller *h*, the inking-roller arms *l*, by the action of the cam $d^2$ on the inner side of the gear-wheel *d* and through the crank *z*, will have caused the inking-rollers to pass upward from off the type and onto the ink-distributing cylinder *p*, where said inking-rollers will receive a fresh supply of ink. The continued revolution of the shaft *c* will cause the cam *i* to pass by or over the friction roller *h* on the toggles, and said toggles will descend to the position shown in Fig. A, bringing with them the bed until said bed occupies the position shown in Fig. A. During the last-mentioned movements of the toggles and the bed the platen, through the continued action of the gear-wheel *d* and the segment gear-lever *e* and the gear-wheel *w*, will have caused the gripper-frisket, through the action of the cams *y*, to open and relieve the sheet that has been printed, so that said sheet may be removed from the platen and a succeeding sheet laid thereon. Soon after the platen commences its counter movement from the point of impression, and as soon as, or the moment before, the bed arrives at the position shown in Fig. A, the inking-rollers, by the action of the cam $d^2$ through the crank *z*, will leave the ink-distributing cylinder *p* and pass and repass over the form for the purpose of inking said form, and again assume the position shown in Fig. A. The inking-rollers *o o*, when not in the movement of passing and repassing over the form, will receive their supply of ink from the ink-distributing cylinder *p*, or some equivalent device.

It will be seen that I use in my improvements inking-roller arms, or that I form a frame to hold and carry my inking-rollers forward and backward over the form for each impression, and that the arms forming this frame rock upon a fixed center. Now, frames to hold and carry inking-rollers are not new, as they are extensively used; but to impart to an inking-roller frame a rocking motion is simple, new, and useful, and has never before been done. I do not mean to confine myself to any precise manner of constructing this frame, so long as such frame shall hold the inking-rollers and carry them by the rocking of such frame forward and backward over the form for each impression. I use a vibrating bed, in combination with a rocking platen, and I place the bed so that the face of the type and the face of the platen shall stand in or nearly in a vertical position at the time of the impression. Thus placing the face of the type and the face of the platen at the time of the impression enables me to economize room and to vibrate the bed readily from the impression in order that the inking-rollers may ink the form, and that the platen may be rocked freely and quickly to a proper position for the reception of the sheet to be printed. Thus placing the bed brings the face of the type, as it moves from the impression, into such position that it may be seen by the pressman. Thus rocking the platen for the reception of the sheet brings the face of the platen so that it may be seen by the pressman. Thus placing the bed brings the inking-rollers into such position when inking the form that they may be seen by the pressman. I place the ink-distributing cylinder, or its equivalent, at the top of the press, so that said cylinder may be seen by the pressman; in short, all of these parts may be seen by the pressman while he is standing in front of the press to feed and drive it, which has never before been accomplished by any other press having a rocking platen. Thus placing, combining, and operating these parts substantially as described enables me to accomplish the desirable and highly-valuable results above set forth.

What I claim as new, and desire to secure by Letters Patent, is—

1. A bed vibrating to and from the impression, in combination with a rocking platen, rocking to and from the impression, for the purposes herein set forth, substantially as described.

2. Rocking the inking-roller arms or frame upon a center, so that the inking-rollers may pass and repass over the form of types for each and every impression, whether said rocking frame be constructed in the precise manner described or in some equivalent way to produce a like result.

3. The bearers, or their equivalents, in combination with the rocking inking-roller arms or frame, for the purpose of passing and repassing the inking-rollers over the type or form in a line parallel with the face of the type, when each rocking roller-frame shall carry the inking-rollers forward and backward over the type for each and every impression.

4. Vibrating the bed from the point of its receiving the inking-rollers to the point of impression, as described.

5. The rocking inking-roller arms or frame, in combination with a vibrating bed, substantially as herein specified.

6. Constructing a printing-press with a rocking platen, so that the pressman, while feeding and driving the press, may stand directly in front of said press for such purpose and be enabled without changing his position to see the face of such rocking platen as it rocks or turns toward him for the reception of the sheet to be printed, the face of the type or form as it moves to and from the impression, the ink-distributing cylinder, or its equivalent, from its being placed at the top of the press, and the inking-rollers when inking the type or form, thereby enabling said pressman to detect any imperfection in the working of these parts of the press, all substantially as herein set forth.

Witnesses: GEO. P. GORDON.

J. C. CROSMAN,

GEO. W. HUNT.